United States Patent
Michon et al.

(10) Patent No.: US 6,948,313 B2
(45) Date of Patent: Sep. 27, 2005

(54) BRAKE BOOSTER DEVICE FOR MOTOR VEHICLE

(75) Inventors: Jean-Pierre Michon, Saint Pathus (FR); Stéphane Lacroix, Tournan en Brie (FR)

(73) Assignee: Robert Bosch GmbH, Stottgart (DE)

( * ) Notice: Subject to any disclaimer, the term of this patent is extended or adjusted under 35 U.S.C. 154(b) by 81 days.

(21) Appl. No.: 10/433,450

(22) PCT Filed: Nov. 26, 2001

(86) PCT No.: PCT/FR01/03719

§ 371 (c)(1),
(2), (4) Date: Jun. 3, 2003

(87) PCT Pub. No.: WO02/44000

PCT Pub. Date: Jun. 6, 2002

(65) Prior Publication Data

US 2004/0088974 A1 May 13, 2004

(30) Foreign Application Priority Data

Nov. 29, 2000 (FR) .......................................... 00 15543

(51) Int. Cl.[7] .............................................. B60T 13/573
(52) U.S. Cl. .......................................... 60/552; 60/553
(58) Field of Search .................................... 60/552, 553

(56) References Cited

U.S. PATENT DOCUMENTS

| 5,921,084 | A | * | 7/1999 | Gautier et al. ................ 60/553 |
| 5,941,071 | A | * | 8/1999 | Simon Bacardit ............ 60/553 |
| 6,082,109 | A | * | 7/2000 | Simon Bacardit ............ 60/553 |
| 6,718,765 | B2 | * | 4/2004 | Michon et al. ............... 60/553 |

* cited by examiner

*Primary Examiner*—Matthew C. Graham
(74) *Attorney, Agent, or Firm*—Leo H McCormick, Jr.; Warren Comstock

(57) ABSTRACT

Braking device including a master cylinder (2), a primary piston (3), a control member (4), a booster (6) coupled to the control member (4), and an assist valve (VA) defined by a reaction piston (17) with a bore (18) therein for receiving a ratio control member (24). The control member (24) has a piston (29) with a head (25) located in a chamber (26) between the reaction piston (17) and a bushing (27) retained in the bore (18). The bushing (27) has an axial passage (28) that receives a head (25) of piston (29) to form a valve (36) for closing an inlet to a passage (30) in the piston (29). The bushing (27) slides within bore (18) to limit a pressure difference between the chamber (26) and a front part (18a) of the bore (18) to a value below a pressure difference that causes the valve (36) to open.

9 Claims, 3 Drawing Sheets

BRAKE BOOSTER DEVICE FOR MOTOR VEHICLE

The invention relates to a boosted braking device, for a motor vehicle, of the type which comprise a master cylinder controlling the pressure in at least one brake circuit, a primary piston mounted to slide in the master cylinder to create a pressure variation therein, this primary piston being subjected to an actuating force made up of an input force exerted by a manual-control member generally consisting of a brake pedal, and a boost force exerted by a booster which is coupled to the manual-control member.

BACKGROUND OF THE INVENTION

The booster may be pneumatic and comprise a rigid casing divided into two pneumatic chambers by a moving partition which may be subjected to a difference in pressure between the chambers under the action of a valve actuated by the manual-control member.

A braking device of this type is known, for example from EP-B-0 662 894.

The conditions under which braking is performed may differ. A first scenario corresponds to ordinary conditions when an obstacle is seen from a distance and braking is performed relatively gently; this braking is known as "slow braking". Another scenario is that of abrupt braking or "emergency braking", for example when an obstacle appears suddenly in front of the driver who has to bring his vehicle to rest as quickly as possible.

In order to satisfy these various braking conditions, a boosted braking device of the above defined type has been supplemented by an emergency assist valve capable of initiating the intervention of at least two boost ratios corresponding respectively to slow braking and to emergency braking; the boost ratio for slow braking is lower and the reaction opposing the advance of the manual-control member is greater. For emergency braking, the boost ratio is higher and the reaction against the manual-control member is weaker, which means that the driver can brake for longer and more heavily.

By convention, the term "front" will be used in the remainder of the description to denote a direction directed from the control member toward the master cylinder and the term "rear" or "back" will be used for the opposite direction.

The emergency assist valve comprises a reaction piston which slides in a sealed manner at the rear of a bore of the primary piston, the front part of this bore communicating with the interior volume of the master cylinder, the reaction piston comprising an axial passage through which there passes a ratio control which at its front end has a head located in a chamber lying between the reaction piston and a bushing housed further forward in the bore of the primary piston, this bushing having an axial passage in which a rapid piston of cross section smaller than that of the reaction piston can slide, which rapid piston also has an axial passage open at each end, the rear end of the rapid piston and the head of the ratio control forming a valve capable of shutting off the inlet to the passage of the rapid piston.

The slow boost ratio involves the reaction piston, which has the larger cross section; emergency braking involves the rapid piston which has a smaller cross section.

It has become apparent that such a braking device equipped with an emergency assist valve, while being entirely satisfactory from the operational and braking force point of view, makes noise, particularly at the end of slow braking.

The object of the invention is, above all, to provide a braking device of the type defined previously, equipped with an emergency assist valve. In which the aforementioned drawback does not occur, or at least occurs to a lesser extent. It is also desirable for the solution proposed to remain simple and economical.

SUMMARY OF THE INVENTION

According to the invention, a boosted braking device for a motor vehicle, equipped with an emergency assist valve, of the type defined previously, is characterized in that it comprises a means for limiting the pressure difference between, on the one hand, the chamber lying between the reaction piston and the bushing and, on the other hand, the zone of the bore of the primary piston which is situated forward of the bushing, to a value below the one which can cause the valve formed by the head of the ratio control and the rear end of the rapid piston to open.

Before finding the solution, the inventors had to find the source of the noise in question. The inventors were able to determine that this noise was produced under slow-braking conditions beyond the maximum boost force that the booster could provide, that is to say beyond the "saturation" point defined later on, and that it was due to a sudden flow of fluid following the sudden opening of the valve. According to the invention, this undesired opening of the valve is avoided and the noise is eliminated. Furthermore, the valve is acted upon less often, and its life is improved.

According to a first possibility, the means for limiting the pressure difference consists in mounting the bushing so that it can slide in a sealed manner in the bore of the primary piston. Advantageously, a fixed stop, in particular a ring anchored in the wall of the bore of the primary piston, is provided to retain the bushing on the side facing toward the reaction piston, while the other side of the bushing is subjected to the action of a spring.

According to an alternative form, the bushing is axially immobilized in the bore of the primary piston and the means for limiting the pressure difference comprises a connecting duct connecting between the chamber and the zone forward of the bushing, this connecting duct comprising a non-return valve rated at a value that allows flow without perceptible noise in the chamber-front zone direction.

According to another alternative form, a compressible foam ring is placed in the chamber, this ring being capable of reducing in volume once a given limiting pressure is reached, this pressure being lower than the limiting value that is acceptable for avoiding the opening of the valve.

Apart from the provisions explained hereinabove, the invention consists in a certain number of other provisions which will be dealt with more fully hereinafter with regard to some exemplary embodiments described in detail with reference to the appended figures.

DETAILED DESCRIPTION OF THE INVENTION

The overall structure and general operation of a boosted braking device of the type of the invention are known, particularly from patents EP-B-0 652 894 or FR-B-2 658 466, and only a brief reminder thereof will be given. For further details, reference may be made to the two aforementioned patents.

Figure 1:
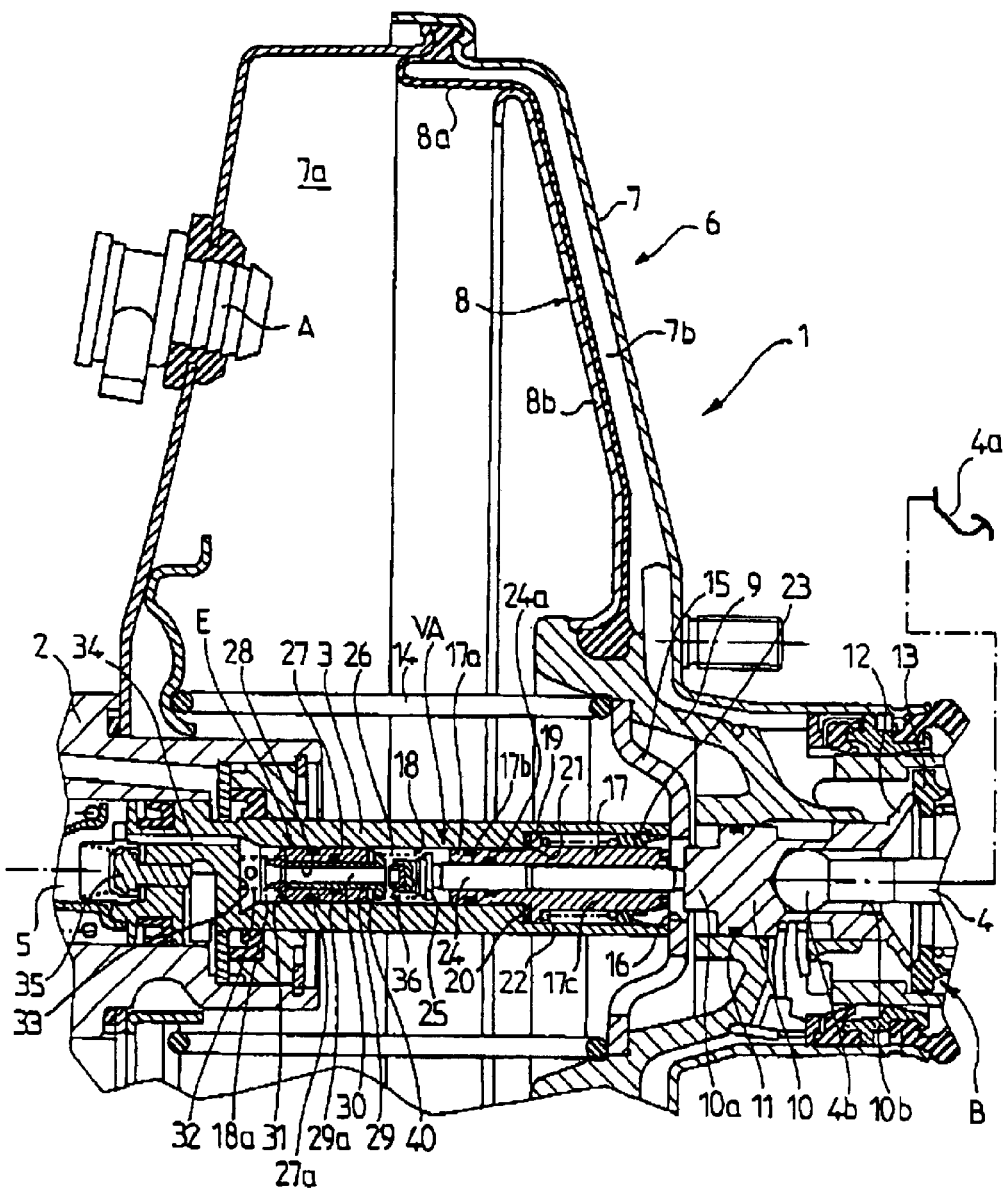
FIG. 1 is a part view in section with partial cutaway of a braking device according to the invention.

FIG. 1 shows a braking device 1 for a motor vehicle which comprises a master cylinder 2, depicted in part, and a primary piston 3 mounted to slide in the master cylinder 2. A manual-control member 4 consisting of a linkage coaxial with the primary piston 3 is designed to exert on this piston an input force from back to front, that is to say from right to left in the depiction of FIG. 1. The forward displacement of the primary piston 3 creates an increase in pressure of the liquid in the interior volume 5 of the master cylinder 2, connected to at least one hydraulic brake circuit. The control member 4 is generally actuated by a brake pedal 4a, depicted schematically.

A pneumatic booster 6 is coupled to the control member 4. The booster 6 comprises a rigid casing 7 divided internally in a sealed manner into two pneumatic chambers 7a, 7b by a moving partition 8 comprising a diaphragm 8a made of elastomer and a rigid skirt 8b. The chamber 7a is connected permanently to a source of partial vacuum (not depicted) by a nozzle A. A pneumatic piston 9 in the form of a sleeve coaxial with the primary piston 3 is fixed to the rigid skirt 8b. The pneumatic piston 9 is mounted to slide on a plunger distributor 10 in a sealed manner by virtue of an O-ring 11. The plunger distributor 10 comprises, toward the front, a smaller-diameter extension 10a and, toward the rear, a blind axial housing 10b, open toward the rear, that accommodates a ball 4b provided at the end of the linkage 4.

On the opposite side to the piston 3, the plunger distributor 10 has a frustoconical widening 12 which may bear in a sealed manner against an elastomer ring 13 connected in terms of axial translation to the pneumatic piston 9. The assembly 12, 13 constitutes part of a three-way valve B (partially depicted) which either allows the chamber 7b to be isolated from the atmosphere and the chambers 7a, 7b to be placed in communication or allows the chambers 7a, 7b to be isolated from one another and air at atmospheric pressure to be let into the chamber 7b when the widening 12 moves axially away from the ring 13.

The pneumatic piston 9 is returned toward its position of rest, depicted in FIG. 1, by a compression spring 14 placed between the piston 9 and the wall opposite of the casing 7 to which the master cylinder 2 is fixed. A cup 15 with a central opening 16 bears axially via its exterior peripheral edge against a shoulder of the pneumatic piston 9. The spring 14 presses the edge of this cup against the piston 9. The cup 15 bears axially, via the interior edge surrounding its opening 16, against the rear end of the primary piston 3. The extension 10a of the plunger distributor 10 can pass freely through the opening 16.

An emergency assist valve VA is provided to initiate the intervention of at least two boost ratios corresponding respectively to slow braking and to emergency braking.

The valve VA comprises a reaction piston 17, of which a smaller-diameter front part 17a slides in a sealed manner, by virtue of an O-ring 17b, in an axial bore 18 of the primary piston 3. The rear part 17c of the reaction piston has a greater diameter and has a flange 19 which can slide in a larger-diameter rear zone of the bore 18 of the primary piston 3. A ring 20 made of elastic material is placed against the flange 19, on the same side as the part 17a. This ring 20 can come to bear axially against a shoulder 21 of the primary piston 3. On the other side, the flange 19 acts as an axial thrust base for a preloaded, helical compression spring 22 known as the jump spring. At its other rear end the spring 22 bears against a clip-in ring 23 made of plastic anchored to the primary piston 3 and in which the rear part 17c of the reaction piston slides.

The reaction piston 17 has an axial bore in which a ratio control 24 is mounted to slide in a sealed manner by virtue of an O-ring 24a. The rear end of the ratio control 24 bears against the extension 10a of the plunger distributor 10. The front end of the ratio control 24 has a head 25 located in a chamber 26 of the bore 18 lying between the reaction piston 17 and a bushing 27 housed further forward in the bore 18.

The bushing 27 has an axial bore 28 which passes completely through it and in which a rapid piston 29 is mounted to slide, in a sealed manner by virtue of an O-ring 29a. The outside diameter of the rapid piston 29 is smaller than that of the part 17a of the reaction piston. The rapid piston 29 has, passing through it axially, a passage 30 which opens at each end. The front end of the rapid piston 29 bears against a ring 31 pushed elastically by a spring 32 against the bushing 27. The spring 32 bears, at the other end, against an end wall 33 located forward of the bore 18. The front zone 18a of the bore 18, in which the spring 32 is housed, communicates via a passage 34 with the interior volume 5 of the master cylinder 2. The spring 32 is subjected to a preload lower than that of the spring 22. A valve 35 is also provided so that when the volume 5 is no longer under pressure, this volume can be resupplied with liquid from a reservoir (not depicted).

The rear end of the rapid piston 29 is located in the chamber 26, near the head 25 of the ratio control 24. This rear end of the rapid piston 29 forms, with the head 25, a valve 36 which, for example, has an annular bearing surface 37 (FIG. 3) on the end face of the rapid piston 29, and an elastomer stopper 38, fixed in the head 25, part of which projects relative to the head, this part having an annular peripheral edge capable of bearing in a sealed manner against the bearing surface 37. A compression spring 39 is positioned between two shoulders provided respectively on the piston 29 and on the head 25, so as to open the valve 36 at rest.

According to the invention, a means E is provided for limiting the pressure difference between the chamber 26 and the zone 18a situated on the opposite side of the bushing 27 to the chamber 26, to a value such that the valve 36 cannot open in the event of slow braking beyond the saturation point. As a preference, the pressure difference is limited to a value of below 5 bar.

Figure 2:
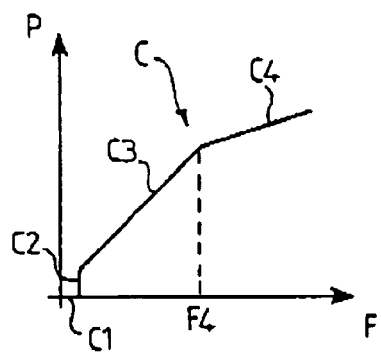
FIG. 2 is a graphical depiction of the variation in braking pressure plotted on the ordinate axis as a function of the input force exerted on the brake pedal, plotted on the abscissa axis.

Before continuing with the description, reference is made to FIG. 2 to explain the expression "saturation".

Curve C in FIG. 2 represents, on the ordinate axis, the braking pressure P or hydraulic pressure in the volume 5, as a function of the input force F exerted on the control member 4 in the axial direction. Curve C comprises a horizontal first part C1 of zero value on the ordinate axis, which corresponds to the travel of the linkage 4 for operating the three-way valve B.

C1 is followed by a vertical segment C2 known as the "Jump" which corresponds to a phase of the spring 22 being compressed by the reaction piston 17, following the increase in pressure of the liquid in the master cylinder 2 as a result of the boost force exerted by the booster on the primary piston 3. The reaction piston 17 retreats until it comes into abutment against the extension 10a.

Curve C continues in the form of a segment C3 of steep gradient which corresponds to the combined action of the control member 4 and of the booster 7 of the primary piston 3. Saturation occurs when the boost force of the booster 6 has reached its maximum value, that is to say when the pressure difference between the two chambers 8a, 8b can no longer increase; this situation corresponds to the abscissa value F4. Curve C continues in the form of a segment C4, the gradient of which is not as steep as that of the segment C3, because the increase in pressure P is due only to the increase in the manual input force exerted on the member 4.

According to a first possibility, the means E for limiting the pressure difference between the chamber 26 and the zone 18a lies in the bushing 27 being mounted to slide within the bore 18. The bushing 27 slides in a sealed manner by virtue of an O-ring 27a. An elastic spilt ring 40 is anchored in a groove of the bore 18, behind the bushing 27, to act as an axial stop for this bushing 27 pushed by the spring 32.

Mounting the bushing 27 so that it can slide allows this bushing to move forward, that is to say to move in a direction which increases the volume of the chamber 26 and therefore reduces the pressure in this chamber.

Figure 5:
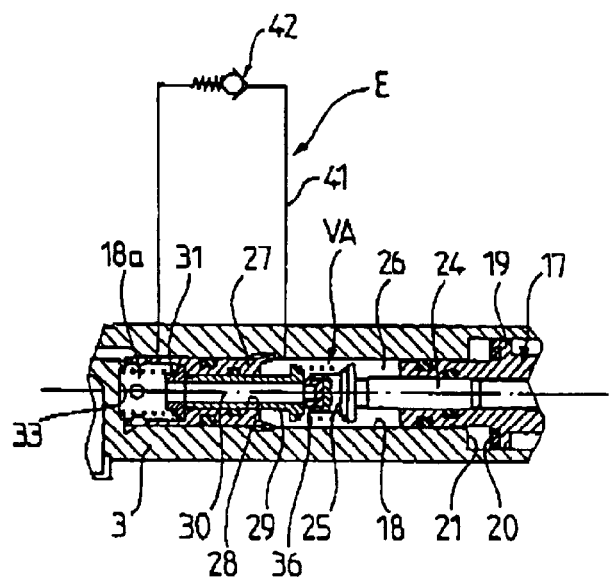
FIG. 5, finally, schematically depicts an alternative form of embodiment.

According to an alternative form depicted schematically in FIG. 5, the bushing 27 is axially immobilized in the bore 18 and the means E for limiting the pressure difference between the chamber 26 and the zone 18a comprises a connecting duct 41 connecting these two spaces and equipped with a non-return valve 42 capable of allowing liquid to pass from the chamber 26 to the zone 18a. The valve 42 is rated at a pressure value which is low enough, preferably below 5 bar, for liquid to flow without perceptible noise.

According to another alternative form, not depicted, a precompressed cellular foam ring, capable of crushing only upward of a certain limiting pressure, for example of the order of 80 bar, is provided in the chamber 26 so that, by becoming crushed upward of the limiting pressure, it allows the volume available for the liquid in this chamber 26 to increase.

That being the case, the way in which the boosted braking device according to the invention works is as follows, in the case of slow braking.

Figure 3:
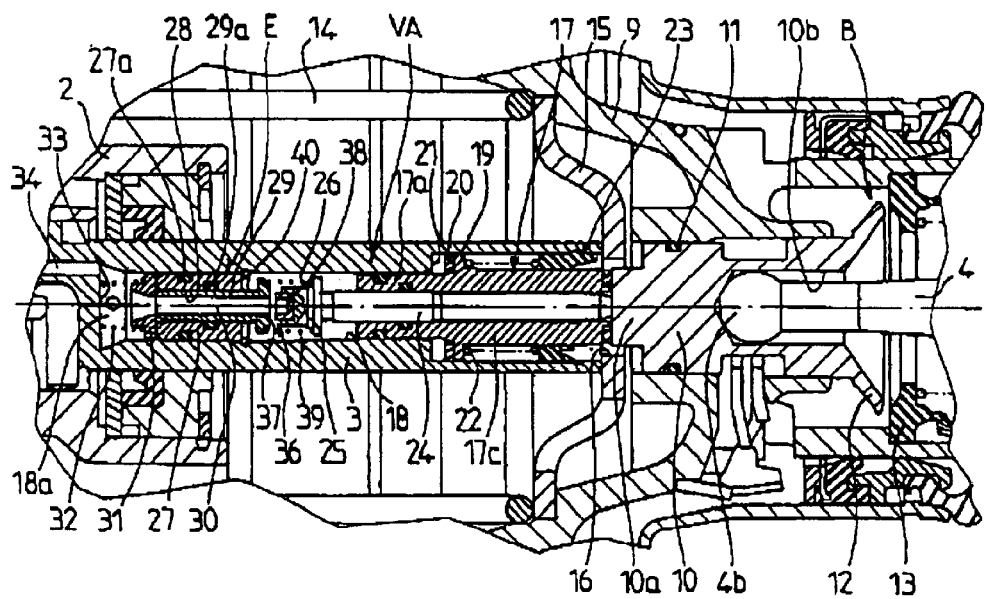
FIG. 3 is a part view in section, on a larger scale, of elements of FIG. 1 during slow braking before saturation is reached.

The manual-control member 4 is displaced, relatively slowly, to the left. The valve B is actuated and cuts off the communication between the chambers 7a and 7b and then the frustoconical widening 12 moves away from the elastic ring 13 which allows air at atmospheric pressure to enter the chamber 7b of the pneumatic booster 6. The moving partition 8 transmits the boost force to the pneumatic piston 9, which moves forward against the action of the spring 14. The piston 9 carries with it the cup 15 which pushes the primary piston 3 forward. The pressure of the liquid increases in the volume 5 and in the chamber 26 because the valve 36 is open. The pressure gives rise to a backward force on the reaction piston 17. When this force reaches and exceeds the preload of the spring 22, the reaction piston 17 retreats until such time as it comes into abutment against the extension 10a, as illustrated in FIG. 3. The jump C2 (FIG. 2) occurs.

Under the action of the input force on the member 4, the plunger distributor 10 continues its forward movement; the pneumatic piston 9 follows the plunger distributor 10 and pushes the primary piston 3 with the boost force. The pressure of the liquid in the volume 5 continues to increase, and also in the chamber 26.

When saturation is reached, the booster 6 produces its maximum boost force. The primary piston 3 remains stationary for a brief period of time because the force exerted backward by the pressure P balances the boost force.

Figure 4:
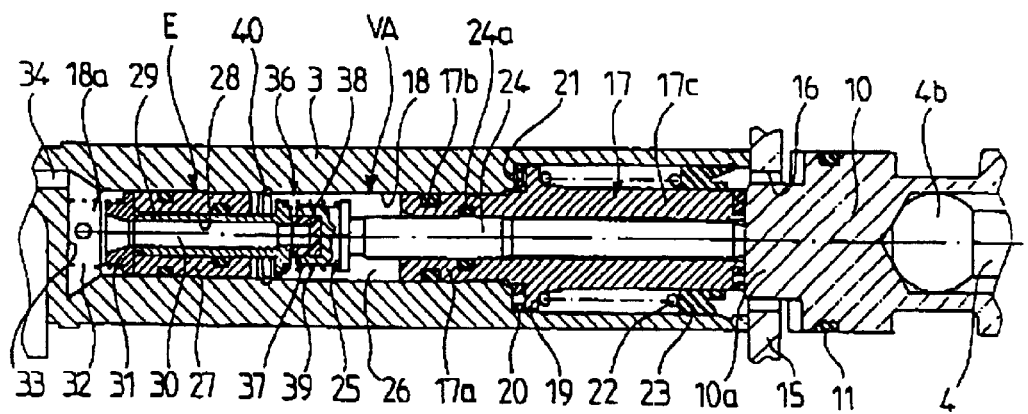
FIG. 4 is an axial section, on a larger scale, of elements of FIG. 3 during slow braking after saturation is reached.

The control member 4 continues to advance under the action of the manual input force. The ratio control 24 advances relative to the primary piston 3 and the head 25 via its plug 38 presses against the bearing surface 37 of the rapid piston 29. The valve 36 closes. The reaction piston 17 bearing against the extension 10a also advances relative to the primary piston 3 until the ring 20 comes into abutment against the shoulder 21 of the primary piston 3 as illustrated in FIG. 4. Continued input force on the control member 4 allows the primary piston 3 to be driven along, via the reaction piston 17, and the braking pressure to be increased.

During the advancing movement of the reaction piston 17 relative to the primary piston 3, the volume of the chamber 23 tends to decrease, which causes, in this chamber 26, an increase in pressure which, if it becomes too great, would cause the valve 36 to open suddenly and would cause the noise mentioned at the start of the description, as a result of sudden flow.

This unwanted flow is avoided, according to the invention, because the bushing 27 moves forward, compressing the spring 32 when the pressure increases in the chamber 26. The pressure in the chamber 26 is thus held at a limited value which does not cause the valve 36 to open; as a preference, the pressure difference between the chamber 26 and the zone 18a is limited to a value of below 5 bar.

According to the alternative form in FIG. 5, the bushing 27 is immobilized in the bore 28 but the valve 42 allows liquid to flow from the chamber 26 to the zone 18a under a pressure which low enough for no noise to be perceptible; as a preference, the pressure difference between the chamber 26 and the zone 18a is limited to a value of below 5 bar.

The operation under rapid braking is unmodified. As soon as rapid braking begins, the ring 20 comes to bear and remains bearing against the shoulder 21 of the primary piston 3.

When the driver releases the brake pedal 4a with his foot, the valve B, on the one hand, closes at the level of 12 and 13 and, on the other hand, allows the pressures in the chambers 7a and 7b to return to a state of equilibrium, thus canceling the action of the booster 6 and causing an end to braking and a return to the position of rest.

Although the description has been given using a pneumatic booster, the booster could be hydraulic, but with saturation corresponding to maximum boosting.

What is claimed is:

1. A boosted braking device, for a motor vehicle, comprising a master cylinder (2) controlling the pressure in at least one brake circuit, a primary piston (3) mounted to slide in a bore within the master cylinder to create a pressure variation therein, said primary piston (3) being subjected to an actuating force made up of an input force exerted by a manual-control member (4) and a boost force exerted by a booster (6) which is coupled to the manual-control member (4), and an emergency assist valve (VA) comprising a reaction piston (17) which slides in a sealed manner within a rear part of a bore (18) of the primary piston (3) while a front part (18a) of said bore (18) is communication with an interior volume (5) of the master cylinder, said the reaction piston (17) having an axial passage through which there passes a ratio control means (24) having a front end with a head (25) that is located in a chamber (26) lying between the reaction piston (17) and a bushing (27) that is located further forward in the bore (18) of the primary piston, said bushing (27) having an axial passage (28) in which a rapid piston (29) of cross section smaller than that of the reaction piston slides, said rapid piston (29) having an axial passage (30) open at each end, the rear end of the rapid piston and the head of the ratio control means (24) forming a valve (36) for shutting off an inlet to the passage (30) of the rapid piston (29), characterized in that said emergency assist valve (VA) includes means (E) for limiting a pressure difference between said chamber (26) lying between the reaction piston (17) and the bushing (27) and, front part (18a) of the bore (18) of the primary piston (3) which is situated forward of the bushing (27), to a value below a predetermined pressure differential that causes use the valve (36) formed by the head of the ratio control means (24) and the rear end of the rapid piston (29) to open.

2. The boosted braking device according to claim 1, characterized in that said the means (E) limiting limits said the pressure difference between the chamber (26) and the zone (18a) to a value of below 5 bar.

3. The boosted braking device according to claim 1 characterized in that said means (E) consists in mounting said bushing (27) to slide in the bore (18) of the primary piston (3).

4. The boosted braking device according to claim 3, characterized in that a seal (27a) allow leak tight sliding of said bushing (27) in the bore (18).

5. The boosted braking device according to claim 4, characterized in that a fixed stop (40) is provided behind, the bushing (27) to retain said bushing (27) on the side facing toward the reaction piston (17), while the other side of the bushing (27) is subjected to the action of a spring (32).

6. The boosted braking device according to claim 5, characterized in that said fixed (40) stop is formed by a ring (40) anchored in a wall of the bore (18) of the primary piston.

7. The boosted braking device according to claim 1, characterized in that ad the bushing (27) is axially immobilized in the bore (18) of the primary piston (3) and said means (E) for limiting a pressure difference includes a connecting duct (41) for connecting said chamber (26) and zone with the front part (18a) of bore (18) forward of the bushing (27) and, a non-return valve (42) rated at a value that allows flow without perceptible noise in the with the front part (18a) direction.

8. The boosted braking device according to claim 7, characterized in that with the front part (18a) non-return valve (42) is rated at a value of below 5 bar.

9. The boosted braking device according to claim 1, characterized in that a compressible foam ring is placed in the chamber (26), said ring reducing in volume of chamber (26) once a given pressure is reached, said given pressure being lower than a limiting value that is acceptable for avoiding the opening of the valve (36).

* * * * *